United States Patent
Vermunicht et al.

(10) Patent No.: US 7,517,932 B2
(45) Date of Patent: Apr. 14, 2009

(54) POLY(STYRENE-BUTADIENE-STYRENE) POLYMERS HAVING A HIGH VINYL CONTENT IN THE BUTADIENE BLOCK AND HOT MELT ADHESIVE COMPOSITION COMPRISING SAID POLYMERS

(75) Inventors: Geert E. A. Vermunicht, Ottignies Louvain-La-Neuve (BE); Birgitte M. L. Van de Vliet, Ottignies Louvain-La-Neuve (BE); Jeffrey G. Southwick, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 11/398,249

(22) Filed: Apr. 5, 2006

(65) Prior Publication Data

US 2006/0183844 A1 Aug. 17, 2006

Related U.S. Application Data

(63) Continuation-in-part of application No. 10/508,909, filed as application No. PCT/EP03/03172 on Mar. 24, 2003, now abandoned.

(51) Int. Cl.
*C08F 297/04* (2006.01)
*C08F 9/06* (2006.01)
*C08L 25/10* (2006.01)

(52) U.S. Cl. .................. 524/575; 524/490; 428/355 BL

(58) Field of Classification Search ................ 524/575, 524/490; 528/396; 428/355 BL
See application file for complete search history.

(56) References Cited

U.S. PATENT DOCUMENTS

| | | | | |
|---|---|---|---|---|
| RE27,145 E | * | 6/1971 | Jones | 260/880 |
| 4,089,824 A | * | 5/1978 | Bronstert et al. | 524/534 |
| 4,530,985 A | * | 7/1985 | Broekhuis | 526/181 |
| 4,603,722 A | * | 8/1986 | Oshima et al. | 152/209.5 |
| 4,792,584 A | * | 12/1988 | Shiraki et al. | 524/77 |
| 4,908,401 A | * | 3/1990 | Ohara et al. | 524/495 |
| 5,109,069 A | * | 4/1992 | Shibata et al. | 525/152 |
| 5,183,857 A | * | 2/1993 | Shiraki et al. | 525/285 |
| 5,194,535 A | * | 3/1993 | Koppes et al. | 526/181 |
| 5,405,903 A | * | 4/1995 | Van Westrenen et al. | 525/89 |
| 5,627,235 A | * | 5/1997 | Himes | 525/98 |
| 5,693,718 A | * | 12/1997 | De Groot et al. | 525/314 |
| 5,705,556 A | * | 1/1998 | Djiauw et al. | 524/505 |
| 5,777,031 A | * | 7/1998 | Djiauw et al. | 525/98 |
| 5,777,039 A | * | 7/1998 | De Craene et al. | 525/314 |
| 5,777,043 A | * | 7/1998 | Shafer et al. | 525/339 |
| 5,804,663 A | * | 9/1998 | De Craene et al. | 525/314 |
| 6,730,737 B1 | * | 5/2004 | De Keyzer et al. | 525/105 |
| 6,759,454 B2 | * | 7/2004 | Stephens et al. | 524/68 |
| 6,987,142 B2 | * | 1/2006 | St. Clair et al. | 524/505 |
| 7,001,956 B2 | * | 2/2006 | Handlin et al. | 525/342 |
| 7,186,779 B2 | * | 3/2007 | Joly et al. | 525/98 |
| 7,439,301 B2 | * | 10/2008 | Handlin, Jr. | 525/89 |
| 2005/0119403 A1 | * | 6/2005 | St. Clair | 524/736 |
| 2005/0228114 A1 | * | 10/2005 | Gelles | 524/502 |

FOREIGN PATENT DOCUMENTS

| | | | |
|---|---|---|---|
| EP | 0243956 A2 | | 11/1987 |
| EP | 659 787 A1 | * | 12/1994 |
| EP | 0659787 A1 | | 6/1995 |
| EP | 744 178 A2 | * | 11/1996 |
| EP | 822 227 A1 | * | 2/1998 |
| JP | 63182386 | | 7/1988 |
| JP | 2001787 | | 1/1990 |

* cited by examiner

*Primary Examiner*—Vasu Jagannathan
*Assistant Examiner*—Rip A. Lee
(74) *Attorney, Agent, or Firm*—Michael A Masse; Novak, Druce & Quigg, LLP

(57) ABSTRACT

The present invention provides a poly(styrene-butadiene-styrene) polymer having a high vinyl content in the butadiene block. The polymer also has a polystyrene content from 15% to 20% by weight; a coupling efficiency from 50 to 80%; a styrene block molecular weight from 9,000 to 10,000 g/mol; a vinyl content from 20 to 45%; and a melt flow rate of equal to or greater than 10.

8 Claims, No Drawings

# POLY(STYRENE-BUTADIENE-STYRENE) POLYMERS HAVING A HIGH VINYL CONTENT IN THE BUTADIENE BLOCK AND HOT MELT ADHESIVE COMPOSITION COMPRISING SAID POLYMERS

RELATED APPLICATIONS

The present application is a continuation in part of U.S. patent application Ser. No. 10/508,909, filed Sep. 23, 2004 now abandoned, which is a 371 of PCT/EP03/03172 filed Mar. 24, 2003.

SUMMARY OF THE INVENTION

The present invention comprises a poly(styrene-butadiene-styrene) polymer having a high vinyl content in the butadiene block for packaging tape adhesives and a hot melt polymer adhesive composition comprising said poly(styrene-butadiene-styrene) polymers (SvBS).

More particularly the present invention concerns a hot melt adhesive composition having equal or better properties compared to emulsion acrylic tapes. The adhesive composition of the present invention has excellent tack, adhesive strength, creep resistance and also an excellent treatment capability at high temperature and high box closing properties.

The adhesives of the present invention are suitable for adhesion tapes, labels, pressure sensitive sheets, tacky adhesives for fixing carpets etc.

The advantages of the adhesives of the present invention are that they are lower in cost compared to emulsion acrylic based adhesives or poly(styrene-isoprene-styrene) based adhesives (SIS) while having comparable or better properties.

BACKGROUND OF THE INVENTION

Hot melt adhesives are known, for instance, in the JP 2001787 describing tacky adhesive compositions for tapes comprising a block copolymer of a vinylaromatic hydrocarbon and a high vinyl polybutadiene block. The composition comprises a block copolymer, a tackifying resin and at least one phenol compound. The block copolymer is composed of at least one polymeric block mainly containing butadiene. It has a vinylaromatic hydrocarbon content of 10-36% by weight and the butadiene portions have a vinyl content of 15-55%.

The JP 63182386 discloses sticky block copolymer compositions containing a vinyl aromatic-butadiene block copolymer, a tackifying resin and a phenolic compound. The block copolymer is mainly composed of vinyl aromatic hydrocarbon and at least one polymer block composed of polybutadiene.

The EP-A-0 243 956 discloses an adhesive composition comprising a block copolymer containing at least one vinylaromatic hydrocarbon block and one butadiene containing block, wherein the relationship between the vinylaromatic hydrocarbon block and the 1,2-vinyl content in the butadiene portion is within a ratio between 40 and 70. In addition, the polymers that have been used have a melt flow rate of 5 g/10 min (200° C., 5 kg).

These hot melt compositions however do not have the same properties as those based on SIS in respect of the tack, adhesive strength creep resistance and treatment capacity at high temperature as well as high box closing properties.

The object of the invention is a hot melt adhesive composition having equal or better properties compared to prior art adhesives, especially the acrylic emulsion based adhesives while being cheaper than poly(styrene-isoprene-styrene) (SIS) based adhesives.

Poly(styrene-isoprene-styrene) polymers are currently rarely used in pressure sensitive adhesives despite their relative low cost. The main reason for this is their high viscosity and tendency to cross-link so that the processing step becomes a limiting factor. Surprisingly a new SBS polymer has been developed with molecular parameters suitable for to hot melt adhesive applications.

BRIEF DESCRIPTION OF THE INVENTION

Accordingly, the inventors have provided a poly(styrene-butadiene-styrene) polymer having a high vinyl content in the butadiene block comprising in combination:
i) a polystyrene content (PSC) within a range of 15-20% by weight,
ii) a coupling efficiency of 50-80%,
iii) a step I (MW) between 9000 and 10000 kg/mol
iv) a vinyl content between about 20-45% by weight.

Further the inventors have provided a hot melt adhesive composition comprising:
a) a poly(styrene-butadiene-styrene) polymer having a high vinyl content in the butadiene block
b) a tackifying resin
c) a plasticizer
d) an anti-oxidant
wherein said polymer has:
i) a polystyrene content (PSC) within a range of 15-20% by weight,
ii) a coupling efficiency (CE) of 50-80%,
iii) a styrene block molecular weight between 9000 and 10000 g/mol
iv) a vinyl content between about 20-45% by weight.

DETAILED DESCRIPTION OF THE INVENTION

Preferred poly(styrene-butadiene-styrene) polymers having a high vinyl content in the butadiene block have a polystyrene content between 16-19% by weight, more preferably 16-18%. Likewise the preferred polymers have a coupling efficiency between 60-75%, more preferably 65-70%. Moreover the preferred polymers have a vinyl content between 25-40% by weight, more preferably 30-35.

A suitable embodiment of the present invention is defined as follows:

| | |
|---|---|
| PSC content (%) | 16 |
| CE (%) | 67 |
| vinyl (%) | 33.6 |
| styrene block molecular weight (g/mol) | 9,100 |

According to another embodiment of the present invention the polymer is defined as follows:

| | |
|---|---|
| PSC content (%) | 18 |
| CE (%) | 67 |
| vinyl (%) | 32 |
| styrene block molecular weight (g/mol) | 9,100 |

Suitable styrenes useful for preparing the polystyrene blocks of the SvBS of the present invention are for example styrene, o-methylstyrene, p-methylstyrene, m-methylstyrene, p-tert-butylstyrene, dimethylstyrene, and various other alkyl-substituted styrenes, alkoxy-substituted styrenes vinylnaphthalene and vinyl xylene. The alkyl and alkoxy groups of the alkyl-substituted or alkoxy substituted styrenes respectively preferably contain from 1 to 6 carbon atoms, preferably from 1 to 4 carbon atoms. It is to be noticed that this list is merely illustrative and should not have a limiting effect. The polystyrene blocks may comprise minor amounts (e.g. up to 5% by weight) of copolymerizable monomers.

In the preparation of the polymers according to the invention any suitable difunctional coupling agent can be used. Alternatively, the same polymer may be produced by what is called "full sequential". This is also within the scope of this invention.

The coupling agent may (not preferred) be a multifunctional coupling agent. Suitable coupling agents are dibromo ethane diglycidyl ether of bisphenol A and such like components as known in the art.

As used herein, the term "molecular weight(s)" refers to the molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

Furthermore, as used herein the phrase "step I molecular weight" refers to the molecular weight of the styrene block made in the first step of polymerization. Such phrase may also be referred to as the "styrene block molecular weight".

Suitable tackifiers for preparing the hot melt adhesive composition of the present invention are well-known in the art. They may for example, be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof.

The composition according to the present invention preferably comprises from 50 to 200 parts by weight, more preferably from 100 to 150 parts by weight of a tackifier.

The preferred tackifying resins useful in the present invention are selected within the group of HERCOTAC 205 (trademark), an aromatic modified hydrocarbon resin of the Hercules grade range, used for natural rubber based packaging tapes; PICCOTAC 212 (trademark) a purely aliphatic resin widely used in hot melt pressure sensitive adhesives; MBG 223, a Hercules development grade which is a 35% aromatic modified $C_5$ resin, developed for tackifying SBS based adhesives; MBG 264, a partially hydrogenated hydrocarbon resin used in radiation curable adhesives based on SBS; and A 2514 which is a liquid developmental resin, with a very low softening point to be used in combination with a solid resin to increase the tack properties.

Suitable plasticizers for use in preparing the hot melt adhesive compositions of the present invention include plasticizing oils like low aromatic content hydrocarbon oils that are paraffinic or naphthenic in character (carbon aromatic distribution $\leq 5\%$, preferably $\leq 2\%$, more preferably 0% as determined according to DIN 51378). Those products are commercially available from the Royal Dutch/Shell Group of companies, like SHELLFLEX, CATENEX, and ONDINA oils. Other oils include KAYDOL oil from Witco, or TUFFLO oils from Arco. Other plasticizers include compatible liquid tackifying resins like REGALREZ R-1018. (SHELLFLEX, CATENEX, ONDINA, KAYDOL, TUFFLO and REGALREZ are trademarks).

Other plasticizers might also be added, like olefin oligomers; low molecular weight polymers ($\leq 30,000$ g/mol) like liquid polybutene or liquid polyisoprene copolymers, like liquid styrene/isoprene copolymers or hydrogenated styrene/isoprene copolymers and liquid alpha-olefin polymers; vegetable oils and their derivatives; or paraffin and microcrystalline waxes.

The preferred plasticizers useful in the present invention are for example, CATENEX N956, CATENEX S946, or EDELEX 945.

The composition according to the present invention may, but need not, contain a plasticizer. If it does, then the composition comprises up to 100 parts by weight, preferably 5 to 75 parts by weight, more preferably 10 to 40 parts by weight of a plasticizer.

Several types of antioxidants can be used, either primary antioxidants like hindered phenols or secondary antioxidants like phosphite derivatives or blends thereof. Examples of commercially available antioxidants are IRGANOX 565 from Ciba-Geigy (2.4-bis-(n-octylthio)-6-(4-hydroxy-3,5-di-tertiary-butyl anilino)-1,3,5-triazine), IRGANOX 1010 from Ciba-Geigy (tetrakis-ethylene-(3,5-di-tertiary-butyl-4-hydroxy-hydrocinnamate)methane), IRGAFOS 168 from Ciba-Geigy or POLYGARD HR from Uniroyal (tris-(2,4-di-tertiary-butyl-phenyl)phosphite). Other antioxidants developed to protect the gelling of the polybutadiene segments can also be use, like the SUMILIZER GS from Sumitomo (2[1-(2-hydroxy-3,5-di-ter-pentylphenyl)ethyl]-4,6-di-tert-pentylphenylacrylate); SUMILIZER T-PD from Sumitomo (pentaerythrythyltetrakis(3-dodecylthiopropionate)); or mixtures thereof. (IRGANOX, IRGAFOS, POLYGARD and SUMILIZER are trademarks).

The antioxidant which can be used in the present invention are IRGANOX 1010, IRGANOX 3052, IRGAFOS 168, SUMILIZER GS, SUMILIZER TPD. Extensive research has revealed that optimized antioxidant packages are a combination of IRGANOX 1010/IRGANOX 3052/IRGAFOS 168 or a combination of SUMILIZER GS/SUMILIZER TPD which gave stable hot melts at 180° C.

It should be noticed that the lists of additives disclosed hereabove are merely examples and are not limitative.

Test methods have been performed on the adhesives in order to evaluate those of the present invention which are able to compete with acrylic tapes.

These tests are:

1) Hot melt viscosity stability

Brookfield hot melt viscosity (HMV) at 170° C. during 24 hours

2) Gel content

Gel content on adhesive before (ini) and after HMV measurement (24 hrs) on 50µ filter 3) Tack property Rolling Ball Tack (RBT)

4) Test on cardboard

HP 40° C., 1 kg weight

Plap test, 500 g weight

These tests have shown that in order to attain the object of the present invention, the adhesive composition of (poly(styrene-butadiene-styrene) polymers having a high vinyl content in the butadiene blocks based packaging tapes) ideally should fulfill the following requirements:

| RBT: | 1-5 cm (acceptable <20 cm) |
|---|---|
| Flap test: | 120-250 minutes (acceptable >100 minutes) |
| HP40° C.: | 50-100 minutes (acceptable >40 minutes) |
| HMV | <100 Pa · s. |

The tests have been performed with the following polymers A to H, whereby A to F are comparative examples while G and H are embodiments of the present invention.

TABLE 1

|  | A | B | C | D | E | F* | G | H |
|---|---|---|---|---|---|---|---|---|
| Styrene block MW (g/mol) | 11,300 | 11,800 | 11,100 | 11,600 | 11,100 | 10,004 | 9,100 | 9,100 |
| Step III (g/mol) | 193,000 | 223,800 | 205,300 | 222,900 | 199,800 | 188,400 | 182,100 | 175,200 |
| CE (%) | 65.5 | 82.6 | 53.8 | 17.6 | 23 | 79 | 67 | 67 |
| vinyl (%) | 40.5 | 7.6 | 36 | 9.2 | 55 | 30 | 32 | 33.6 |
| PSC (%) | 18.7 | 17.9 | 17.9 | 17.5 | 18.8 | 19 | 18 | 16 |
| MFR 200° C., 5 kg | 3.0 |  |  |  |  | 5 | 14 | 10 |

*An example in accordance with EP 0 243 956

The properties are shown in Table 2. In that table, the formulation 1 is a general formulation.

TABLE 2

|  | Polymer | | | | |
|---|---|---|---|---|---|
| Form. 1 | A | B | C | D | E |
| HMV @ 170, Pa · s | 57 | 198 | 51 | 26 | 33 |
| RBT (cm) | 15 | 3 | 6 | 1 | 21 |
| HP kraft@40° C., min | 41 | 8 | 9 | 2 | 4 |
| Flap kraft@23° C., min | 548 | 118 | 82 | 22 | 148 |

Form.1 = 100 phr SBS polymer/125 phr HERCOTAC 205/40 phr CATENEX N956/1 phr IRGANOX 1010/1 phr IRGANOX 3052/1 phr IRGAFOS 168
It is to be pointed out that in the formulation 1 the amount of the plasticizer CATENEX ™ N956 (40 phr) id too high and this causes bleeding and migration of the adhesive.

Although the formulation based on polymer A exhibits an acceptable balance of properties, this formulation is not acceptable as polymer A has a too low melt flow rate (MFR<10).

Since formulations with lower oil contents are preferred, for example below 20 phr, polymers with lower styrene block molecular weights have been compared to polymers A to E. These polymers are F, G and H in table 1 and the characteristics of these polymers are indicated in that table 1.

TABLE 3

In another text a formulation 2 is prepared with the SBS polymers F and G, but containing only 20 phr of the plasticizer CATENEX ™ N 956.
Form 2: 100 phr SBS polymer/125 phr HERCOTAC ™ 205/20 phr CATENEX ™ N956/1 phr IRGANOX ™ 1010/1 phr IRGANOX ™ 3052/1 phr IRGAFOS ™ 168
The results of the text are shown hereunder.

|  | F | G |
|---|---|---|
| HMV @ 170, Pa · s | 190 | 63 |
| RBT (cm) | 5 | 27 |
| HP kraft@40° C., min | 51 | 19 |
| Flap kraft@23° C., min | 708 | 135 |

It will be seen that F, having a maximum styrene block molecular weight (step I MW) of more than 10,000, and a maximum coupling efficiency value of 79% and a MFR of 5, results in a far too high HMV (hot melt viscosity) for a packaging tape formulation rendering it hardly processable so that G is the polymer with the best balance of properties.

It should be pointed out that the properties of the adhesives can be further improved in optimizing the formulation. The most suitable molecule is specified by the parameters hereunder which result in a MFR of 10.

The target molecule has the following characteristics:

| Styrene block molecular weight (g/mol) | about 9500 |
|---|---|
| vinyl (%) | about 30 |
| PSC (%) | about 19 |
| CE (%) | about 70 |

In the following tables, examples are shown where one can see how the properties of the adhesive composition can be altered by changing the amounts of the several additives. In table 4 has been used the polymer G and in table 5 has been used the polymer H.

TABLE 4

| Ingredients | F1A | F1B | F2A | F2B | F3 | F4 |
|---|---|---|---|---|---|---|
| Polymer G | 100 | 100 | 100 | 100 | 100 | 100 |
| HERCOTAC 205 | 125 | 125 | 83 | 83 | 94 | — |
| PICCOTAC 212 | — | — | 42 | 42 | 46 | — |
| MBG223 | — | — | — | — | — | 140 |
| CATENEX N956 | 20 | 20 | 20 | 20 | 30 | 30 |
| I1010/I3052/I168 | 3*1 | 3*1 | 3*1 | 3*1 | 3*1 | 3*1 |
| Coating weight, μ | 17 | 24 | 18 | 25 | 18 | 20 |
| HMV, 170° C., (ini) Pa · s | 63 | 63 | 61 | 61 | 40 | 40 |
| RBT, cm | 27 | 5.5 | >30 | >30 | >30 | 7 |
| HP kraft@40° C., min | 19 | 27 | 31 | 55 | 30 | 31 |
| Flap kraft@23° C., min | 135 | 230 | 308 | 681 | 221 | 179 |

3*1 means 1/1/1

TABLE 5

|  | F1 | F2 | F4 | F5 | F6 | F7 |
|---|---|---|---|---|---|---|
| Polymer H | 100 | 100 | 100 | 100 | 100 | 100 |
| HERCOTAC 205 | 125 | 105 | 112.5 | 100 | 125 | 125 |
| PICCOTAC 212 | — | — | 12.5 | 25 | — | — |
| CATENEX N956 | 20 | 15 | 20 | 20 |  |  |
| CATENEX S946 |  |  |  |  | 20 |  |
| EDELEX 945 |  |  |  |  |  | 20 |
| I1010/I168/I3052 | 3*1 | 3*1 | 3*1 | 3*1 | 3*1 | 3*1 |
| Coating weight, μ | 18 | 18 | 20 | 20 | 19 | 19 |

TABLE 5-continued

|  | F1 | F2 | F4 | F5 | F6 | F7 |
|---|---|---|---|---|---|---|
| HMV(ini), 170° C., Pa·s | 100 | 120 | 100 | 90 | 100 | 80 |
| RBT, cm | 29 | 24 | 24 | 30 | 15 | 25 |
| HP kraft@40° C., min | 26 | 36 | 39 | 31 | 37 | 33 |
| Flap kraft@23° C., min | 217 | 239 | 311 | 383 |  | 239 |

It is seen in Table 4 that the compositions F1B and F4 furnish very valuable adhesives falling within the limits of properties desired for the adhesives of the present invention.

Various changes can be made in the above compositions, and products without departing from the scope of the appended claims.

What is claimed is:

1. A hot melt adhesive composition comprising:
   a) a poly(styrene-butadiene-styrene) polymer having a high vinyl content in the butadiene block, said polymer having:
      i) a polystyrene content of from 15% to 20% by weight;
      ii) a coupling efficiency of from 50% to 80%;
      iii) a styrene block molecular weight of each styrene block of from 9,000 to 9,600 g/mol;
      iv) a vinyl content in the butadiene block of from 20 to 40%; and
      v) a melt flow rate of equal to or greater than 10 g/10 min (200° C., 5 kg),
   b) a tackifying resin;
   c) a plasticizer in the amount of 5 to 75 parts by weight; and
   d) an anti-oxidant.

2. The hot melt adhesive composition of claim 1 wherein the polymer has:
   i) a polystyrene content of from 16% to 19%;
   ii) a coupling efficiency of from 60% to 75%;
   iii) a styrene block molecular weight of each styrene block of from 9,400 to 9,600 g/mol; and
   iv) a vinyl content in the butadiene block of from 25% to 40%.

3. The hot melt adhesive composition of claim 1 wherein the polymer has:
   i) a polystyrene content of about 19%;
   ii) a coupling efficiency of about 70%;
   iii) a styrene block molecular weight of each styrene block of about 9,500 g/mol; and
   iv) a vinyl content in the butadiene block of about 30%.

4. The hot melt adhesive composition of claim 1 having
   a) a hot melt viscosity at 170° C. during 24 hours lower than 100 Pa-s (ASTM D3236-78);
   b) a rolling back tack of 1 cm to 5 cm (ASTM D3121-73);
   c) a flap test, 500 g weight, higher than 120 minutes; and
   d) a HP 40° C., 1 kg weight, higher than 50 minutes (ASTM D3654-82).

5. The hot melt adhesive composition of claim 1 wherein the tackifier is present in an amount of from 50 to 200 parts by weight.

6. The hot melt adhesive composition of claim 1 wherein the plasticizer is present in an amount of from 10 to 40 parts by weight.

7. The hot melt adhesive composition of claim 5 wherein the tackifier is present in an amount of from 100 to 150 parts by weight.

8. The hot melt adhesive composition of claim 1 wherein the styrene block molecular weight is 9,100 g/mol.

* * * * *